June 5, 1934.  H. B. LEWIS  1,961,444
MEANS FOR AND METHOD OF IMPROVING THE EFFICIENCY
OF INTERNAL COMBUSTION ENGINES
Filed June 3, 1932  2 Sheets-Sheet 1
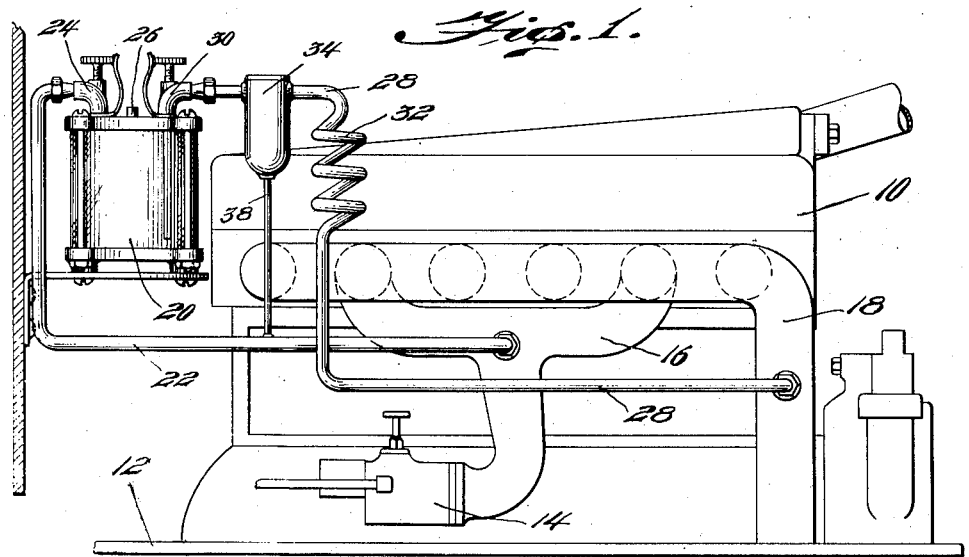
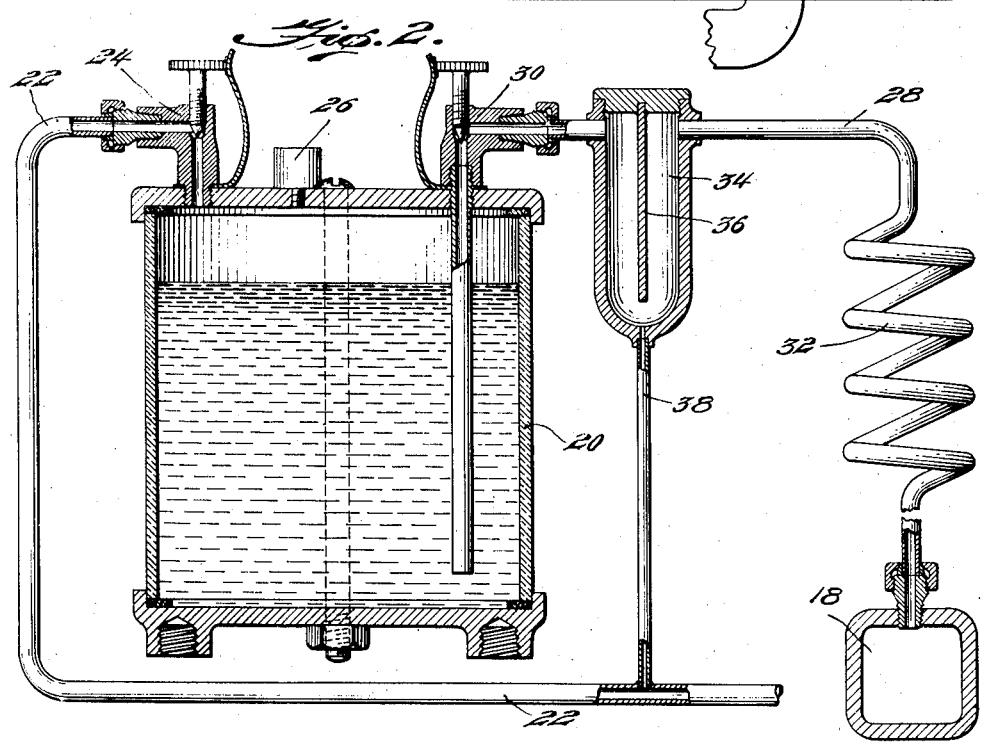
Inventor
Herbert B. Lewis
By Thomas A. Jenckes
Attorney June 5, 1934.  H. B. LEWIS  1,961,444
MEANS FOR AND METHOD OF IMPROVING THE EFFICIENCY
OF INTERNAL COMBUSTION ENGINES
Filed June 3, 1932  2 Sheets-Sheet 2

Inventor
Herbert B. Lewis
By Thomas A. Jenckes
Attorney

Patented June 5, 1934

1,961,444

UNITED STATES PATENT OFFICE

1,961,444

MEANS FOR AND METHOD OF IMPROVING THE EFFICIENCY OF INTERNAL COMBUSTION ENGINES

Herbert B. Lewis, Providence, R. I.

Application June 3, 1932, Serial No. 615,121

11 Claims. (Cl. 123—196)

My invention relates to improvements in means for and method of improving the efficiency of internal combustion engines.

One feature of my invention relates to improvements in the method of and means for supplying the proper amount of lubricant to the engine under varying conditions of engine speed and load. I am aware that others have provided a lubricant supply source and means connecting the lubricant supply source to the intake system of the internal combustion engine whereby the negative pressure created by said engine may draw lubricant thereto from said lubricant supply source and said devices have been preferably also provided with means to adjustably regulate the amount of suction admitted to said lubricant supply source to regulate the amount of lubricant drawn to the engine. Such systems have worked very well while idling, but have not been so efficient when the motor is under a load or picking up speed to supply the proper amount of lubricant to the engine. The action of such system is very analogous to the action of a wind shield wiper of the type connected to the intake manifold which as is well known is apt to be stationary when picking up speed, or when under a heavy load such as going up hill. A main object of my invention therefore is to provide a novel means and method of supplying the proper amount of lubricant to the engine in amounts proportionate to the engine load to insure a proper supply of lubricant to said engine under varying conditions of speed and load. It is well known that the exhaust system emits a substantially regular pulsating discharge substantially proportionate to the load on the engine and in order to insure the proper supply of lubricant to the engine, I employ this source of positive pressure, preferably supplemental to the negative pressure created by the engine at the intake to positively drive a supply of lubricant proportionate to the engine load into the intake to insure a proper supply of lubricant to said engine under varying conditions of engine speed and load. For this purpose I provide means such as a pipe connecting the exhaust system to the lubricant supply source to permit the positive pressure from the exhaust varying in proportion to the engine load to force the lubricant from the supply source into the intake system, the positive pressure and hence the amount of lubricant supply thus varying in proportion to the engine load. I also provide in this pipe means to adjustably regulate the amount of positive pressure admitted to said lubricant supply source and also preferably provide said pipe with a cooling coil and a water separator, the cooling coil being for the double purpose of cooling down the gases so as not to crack or otherwise injure the lubricant and condense the water so that it may become liquefied and run off in the water separator. I thus therefore provide a novel method of positively lubricating internal combustion engines having the intake system thereof connected to a lubricant supply source by injecting positive pressure from the exhaust system thereof into said lubricant supply source to maintain a supply of lubricant to said intake system proportionate to the engine load.

As stated hitherto there are many types of devices functioning to draw oil from a lubricant supply source into the engine intake under the negative pressure or suction created by the engine. My improved invention merely consists in an addition to these already existing systems of a pipe connecting the exhaust system with the lubricant supply source to admit the source of positive pressure from the exhaust to supplement and assist the suction in forcing the supply of lubricant into the intake and as the source of positive pressure is at all time proportionate to the engine load it will insure a supply of lubricant to the engine at all times proportionate to said load.

In addition it has been well known that the addition of water to the intake of an internal combustion engine improves combustion and various attempts in all sorts of burning equipment have been made to introduce water at this point. While various theories as a reason for this have been advanced such as that the water acts as a lubricant to improve combustion or that it becomes split up into some of its actual chemical constituents and combines with oxygen or other gases present to of itself form combustible gases or otherwise, the fact is generally conceded that it aids the combustion. I therefore broadly speaking, separate water from the exhaust system and return said separated water to said intake system to improve the combustion within said engine. I therefore believe I am the first to provide the broad method of improving combustion in internal combustion engines, which comprises, separating water from the exhaust system and returning it to said engine and means to perform this method. While employing the improved lubricating shown, however, for lubricating the engine under the positive pressure from the exhaust, as stated I provide a pipe leading from the exhaust system to the lubricant supply source and preferably a cooling coil and water separator in this pipe. I thus in the actual lubrication under the positive pressure heretofore described, actually condense and separate water from the exhaust stream which I may return to the intake system in any suitable manner. By separating the water from the exhaust stream leading to the lubricant supply source, I thus am enabled to withdraw water from the exhaust stream to form the double function, namely, (1) that of leading it into the intake system to improve the combustion in the engine and (2) that of separating it from the lubricant to prevent it from diluting the lubricant.

Further features of my invention relate to the simplicity of the preferred type of working parts I preferably employ, which either comprise simple pipes or simple well known mechanical attachments.

These and such other objects of my invention as may hereinafter appear will be best understood from a description of the accompanying drawings thereof which illustrate various embodiments of my invention.

In the drawings, Fig. 1 is a side elevation of an internal combustion engine of an automobile having a standard form of engine lubricating system formerly operated by the engine suction and having my invention attached thereto to insure a supply of positive pressure from the exhaust system to said lubricant supply source to positively lubricate the engine under varying conditions of load and the improved means I employ of separating water from said exhaust stream and returning it to the intake system.

Fig. 2 is a sectional view partially in elevation illustrating the usual lubricant supply source, the exhaust and the pipe leading from the exhaust to the lubricant supply source having a condensing coil, a water separator and throttling valve therein and showing the means I employ for leading the separated water to the intake manifold.

Figure 3:
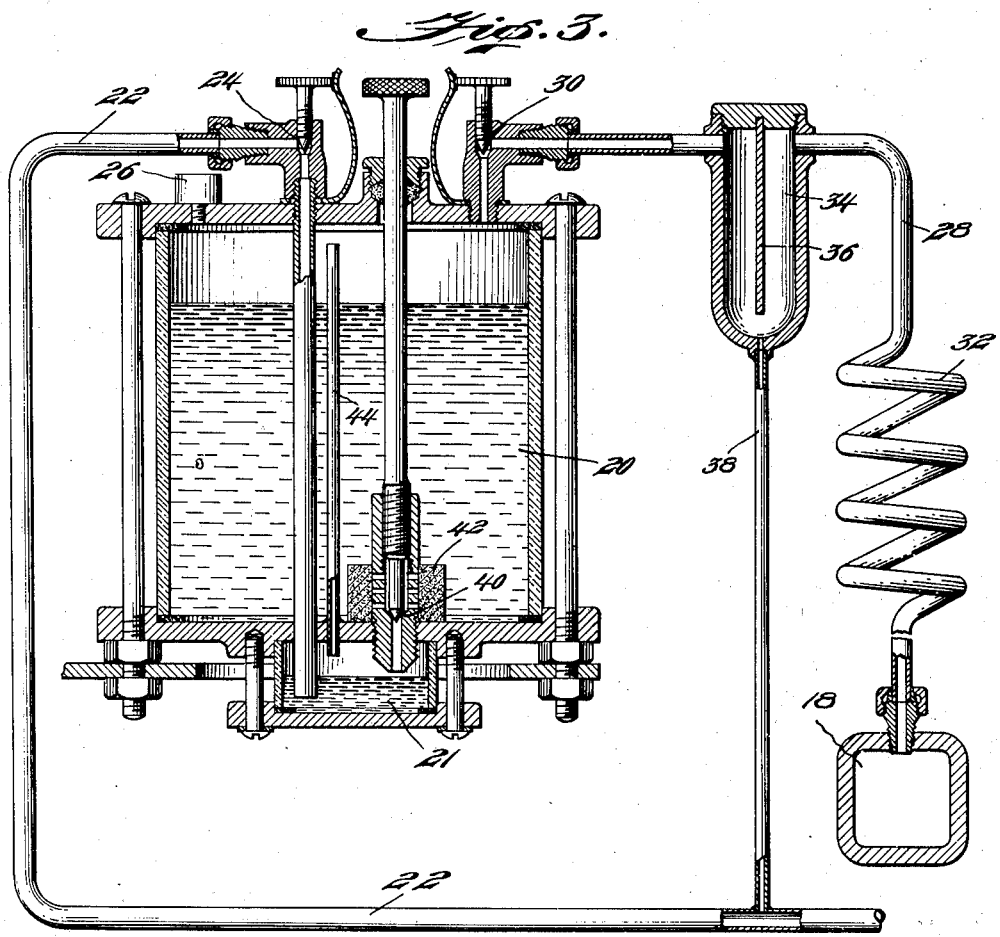
Fig. 3 is a view generally similar to Fig. 2 showing my invention attached to a different and better type of suction lubricating system now on the market modified in accordance with my invention.

In the drawings, wherein like characters of reference indicate like parts throughout, 10 generally indicates a standard type of internal combustion engine suitably mounted on the chassis 12 of an automobile showing the usual carburetor 14 intake system 16 and exhaust system 18.

As stated hitherto, various types of lubricant supply systems have been provided for adding lubricant to the engine preferably through the intake system thereof and I have shown in the drawings such a system which includes the lubricant supply source 21 preferably in either the form of a glass or metal chamber mounted on said chassis 12 preferably adjacent to the intake manifold thereof. Means such as the pipe 22 is provided to connect said lubricant supply source 20 to said intake system 16, whereby the negative pressure created by said engine may draw lubricant thereto from said lubricant supply source. Means such as the throttling valve 24 is also usually provided to adjustably regulate the amount of suction admitted to said lubricant supply source. Said lubricant supply source is also provided with suitable means for filling it and if desired the pressure relief valve 26.

While such systems are more or less common and are on the market today I have found out that while they function in a very satisfactory manner while the motor is idling, they are not so efficient under varying conditions of load on the engine particularly when the engine is subjected to a high speed or a great load as when going up a steep hill, and that at such times the amount of suction necessary to draw the proper supply of lubricant from the source 20 to the intake 16 will be insufficient for a proper lubrication of the engine. I therefore employ a source of positive pressure preferably that of the pulsating exhaust which varies in pressure substantially in proportion to the load on the engine and suitably connect said pulsating positive exhaust pressure to the lubricating supply source 20 to provide a supplemental source of positive pressure to deliver the lubricant to said intake system in amounts proportional to the engine load to insure a proper supply of lubricant to said engine under varying conditions of engine speed and load and to this end I provide means such as the pipe 28 connecting the exhaust system 18 with said lubricant supply source 20. Said means or pipe 28 also is preferably provided with the throttling valve 30 to adjustably regulate the amount of positive pressure admitted through said lubricant supply source 20 and in my preferred embodiment in order that the gaseous exhaust stream may not be so hot when admitted to the lubricant therein and to separate water and other impurities therefrom, I preferably also provide in said pipe 28 the cooling or condensing coil 32 and the water separator 34. While any type of water separator may be employed I preferably as shown in Figs. 2 and 3 employ the standard type of separator 34 in which the gaseous stream impinges against the baffle 36 and the water is exhausted outwardly through a pipe 38. It is well known however, that the addition of water to an internal combustion engine through the intake 16 thereof acts in some manner to improve combustion. I therefore have available a supply of water from the combustion of the gasoline condensed and recovered from the exhaust stream exhausting the products of combustion of the gasoline or other fuel employed, which instead of exhausting into the atmosphere I may readily lead back to the intake system 16 in any suitable manner, as by the pipe 38 attached to the lubricant supply pipe 22. It is thus apparent that I have provided a double combination, namely an improved method and apparatus for securing a positive supply of lubricant to the engine under varying conditions of load and simultaneously therewith condensing from the exhaust stream a supply of water which may be furnished to the intake to aid the combustion in the engine and my invention includes a novel method and apparatus for performing either of these functions individually or in combination, it being noted that by withdrawing water from the exhaust stream prior to admitting it into the lubricant supply source 20 that I have supplementally aided in preventing dilution of the lubricant.

I have shown in Fig. 3 an alternative type of novel so-called suction lubricator for the intake manifold modified so as to apply the principles of my invention thereto. This type of lubricator employs the usual main lubricant supply chamber 20 and a supplemental lubricant supply chamber 21 underneath said main lubricant supply chamber. In this instance the pipe 22 is connected to the supplemental lubricant supply chamber 21 to lead lubricant therefrom to said intake system 16 and the adjustable throttling valve 24 is similarly located in said pipe 22. As in the embodiment shown in Fig. 2 the pipe 28 leads from the engine exhaust system 18 to said main lubricant supply chamber 20 and is provided with the cooling coil 32, water separator 34 and throttling valve 30 therein. The excess pressure relief valve 26 for said main chamber is also provided. As is usual in this lubricator the adjustable throttling valve 40 adjustable from without the chamber 20 is provided to regulate the amount of oil fed from said main supply chamber 20 to said supplemental supply chamber 21, said valve preferably being provided with the oil filtering medium 42 around it. I modify this lubricator in accordance with my invention, namely by the addition of the pipe 28 connecting said main chamber 20 to said exhaust system 18. The pipe 44 is additionally provided connecting the main lubricant supply chamber 20 with the supplemental lubricant supply chamber 21 above the normal levels of lubricant therein. The operation of this device differs slightly from the operation of the device shown in Fig. 2 in that the positive pressure led by the pipe 28 from the exhaust 18 into the main supply chamber 20 operates to force lubricant downwards through the throttling valve 40 into the supplemental supply chamber 21 in proportion to the amount of positive pressure delivered by said pipe 28 from said exhaust and the positive pressure also functions to travel downwards through the medium of the pipe 44 from the upper portion of the main lubricant supply chamber 20 above the normal level of lubricant therein to the supplemental supply chamber 21 above the normal level of liquid therein to force the lubricant admitted into the supplemental supply chamber outwards through the throttling valve 24 and pipe 22 to the intake system 16 and therefore in this embodiment the flow of oil from the main chamber to the supplemental chamber varies in proportion to the positive pressure which in turn varies in proportion to the load on the engine. In this embodiment also the pipe 28 condenses the water and the pipe 38 may lead it either to the atmosphere or to the intake system 16 preferably as shown through the medium of the oil supply pipe 22.

It is apparent therefore that I have provided a novel method and apparatus for increasing the efficiency of internal combustion engines by providing a positive supply of lubricant thereto under varying conditions of load from the positive pressure of the exhaust and also by condensing water from said exhaust stream and returning it to the engine itself to aid in combustion of fuel therein, which invention consists of a minimum number of working parts or attachments for well known types of lubricating systems now on the market.

It is understood that my invention is not limited to the specific embodiments shown or methods described and various deviations may be made therefrom without departing from the spirit and scope of the appended claims.

What I claim is:

1. In combination with an internal combustion engine, having an intake system and an exhaust system, a lubricant supply source, means connecting said lubricant supply source to said intake system whereby the negative pressure created by said engine may draw lubricant thereto from said lubricant supply source, means to adjustably regulate the amount of suction admitted to said lubricant supply source, means connecting said exhaust system to said lubricant supply source to provide a supplemental source of positive pressure to deliver the lubricant to said intake system in amounts proportional to the engine load to insure a proper supply of lubricant to said engine under varying conditions of engine speed and load said means having a cooling coil and water separator connected therein, means to adjustably regulate the amount of positive pressure admitted to said lubricant supply source and means to conduct condensed water from said separator to the intake system.

2. In combination with an internal combustion engine, having an intake system and an exhaust system, a lubricant supply source, means connecting said lubricant supply source to said intake system, means connecting said exhaust system to said lubricant supply source to provide a source of positive pressure to deliver the lubricant to said intake system in amount proportional to the engine load to insure a proper supply of lubricant to said engine under varying conditions of engine speed and load, said means having a cooling coil and water separator connected therein, and means to conduct condensed water from said separator to the intake system.

3. In combination with an internal combustion engine, having an intake system and an exhaust system, a lubricant supply source, means connecting said lubricant supply source to said intake system, means connecting said exhaust system to said lubricant supply source to provide a source of positive pressure to deliver the lubricant to said intake system in amounts proportional to the engine load to insure a proper supply of lubricant to said engine under varying conditions of engine speed and load, said means having a water separator connected therein, and means to conduct condensed water from said separator to the intake system.

4. In combination with an internal combustion engine, having an intake system and an exhaust system, a lubricant supply source, means connecting said lubricant supply source to said intake system, means connecting said exhaust system to said lubricant supply source to provide a source of positive pressure to deliver the lubricant to said intake system in amounts proportional to the engine load to insure a proper supply of lubricant to said engine under varying conditions of engine speed and load said means having a cooling coil connected therein.

5. In combination with an internal combustion engine, having an intake system and an exhaust system, a lubricant supply source, means connecting said lubricant supply source to said intake system, means connecting said exhaust system to said lubricant supply source to provide a source of positive pressure to deliver the lubricant to said intake system in amounts proportional to the engine load to insure a proper supply of lubricant to said engine under varying conditions of engine speed and load, said means having a cooling coil and water separator connected therein.

6. In combination with an internal combustion engine, having an intake system and an exhaust system, a lubricant supply source, means connecting said lubricant supply source to said intake system, means connecting said exhaust system to said lubricant supply source to provide a source of positive pressure to deliver the lubricant to said intake system in amount proportional to the engine load to insure a proper supply of lubricant to said engine under varying conditions of speed and load, said means having a water separator connected therein.

7. The method of positively lubricating internal combustion engines having the intake system thereof connected to a lubricant supply source which comprises injecting positive pressure from the exhaust system thereof into said lubricant supply source to maintain a supply of lubricant to said intake system proportionate to the engine load, separating water from said exhaust system, and returning said separated water to said intake system to improve combustion within said engine and prevent the water from diluting the lubricant.

8. In combination with an internal combustion engine having an intake system and an exhaust system, a lubricant supply chamber, a supplemental lubricant supply chamber underneath said lubricant supply chamber, a pipe connecting said supplemental lubricant supply chamber to said intake system, an adjustable throttling valve in said pipe, a pipe connecting said engine exhaust system to said main lubricant supply chamber, a cooling coil, a water separator, and an adjustable throttling valve in said pipe, an excess pressure relief valve in said lubricant supply chamber, an adjustable throttling valve to regulate the amount of oil fed from said main supply chamber to said supplemental supply chamber, and a pressure pipe connecting the main lubricant supply chamber with the supplemental lubricant supply chamber above the normal levels of lubricant therein.

9. In combination with an internal combustion engine having an intake system and an exhaust system, a lubricant supply chamber, a pipe connecting said lubricant supply chamber to said intake system, an adjustable throttling valve in said pipe, a pipe connecting said engine exhaust system to said lubricant supply chamber, a cooling coil, a water separator and an adjustable throttling valve in said pipe.

10. In combination with an internal combustion engine having an intake system and an exhaust system, a lubricant supply chamber, a supplemental supply chamber underneath said lubricant supply chamber, a pipe connecting said supplemental lubricant supply chamber to said intake system, an adjustable throttling valve in said pipe, a pipe connecting said engine exhaust system to said main lubricant supply chamber, an adjustable throttling valve in said pipe, an excess pressure relief valve in said lubricant supply chamber, an adjustable throttling valve to regulate the amount of oil fed from said main supply chamber to said supplemental supply chamber and a pressure pipe connecting the main lubricant supply chamber with the supplemental lubricant supply chamber above the normal levels of lubricant therein.

11. In combination with an internal combustion engine having an intake system and an exhaust system, a lubricant supply chamber, a pipe connecting said lubricant supply chamber to said intake system, an adjustable throttling valve in said pipe, a pipe connecting said engine exhaust system to said lubricant supply chamber, an adjustable throttling valve in said pipe and an excess pressure relief valve in said lubricant supply chamber.

HERBERT B. LEWIS.